US008825577B2

United States Patent
Fokoue et al.

(10) Patent No.: US 8,825,577 B2
(45) Date of Patent: Sep. 2, 2014

(54) USING PENALTY AND REWARD TO AGGREGATE DATA TO ASSESS TRUST

(75) Inventors: Achille Fokoue, White Plains, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 12/880,357

(22) Filed: Sep. 13, 2010

(65) Prior Publication Data

US 2012/0066167 A1 Mar. 15, 2012

(51) Int. Cl.
G06F 21/24 (2006.01)
G06F 17/22 (2006.01)
G06N 5/02 (2006.01)

(52) U.S. Cl.
CPC ........................................ *G06N 5/02* (2013.01)
USPC ............... 706/46; 706/20; 707/687; 707/690; 707/692

(58) Field of Classification Search
USPC .......................................................... 706/52
See application file for complete search history.

(56) References Cited

U.S. PATENT DOCUMENTS

| | | | |
|---|---|---|---|
| 5,769,451 A | 6/1998 | Inada et al. |
| 7,377,431 B2 | 5/2008 | Urken |
| 7,457,951 B1 | 11/2008 | Proudler et al. |
| 7,634,800 B2 | 12/2009 | Ide et al. |
| 7,694,190 B2 | 4/2010 | Pisarsky |

OTHER PUBLICATIONS

Schafer et al. Recommender Systems in E-Commerce. In ACM Conference on Electronic Commerce, 1999.
Netflix Prize. http://www.netflixprize.com/.
Kamvar et al. EigenTrust: Reputation management in P2P networks. In WWW Conference, 2003.
Xiong et al. Supporting reputation based trust in peer-to-peer communities. In IEEE Transactions on Knowledge and Data Engineering (TKDE), Special Issue on Peer-to-Peer Based Data Management, vol. 71, 16 (7), Jul. 2004.
Kuter et al. SUNNY: A New Algorithm for Trust Inference in Social Networks, using Probabilistic Confidence Models. In AAAI-07, 2007.
Wright et al. Credibility Models for Multi-Source Fusion. In 9th International Conference on Information Fusion, 2006.
D'Amato et al. Tractable reasoning with bayesian description logics. In Scalable Uncertainty Management (SUM08), pp. 146-159, 2008.
Baader et al. The Description Logic Handbook. Cambridge University Press, 2003.
Hastie et al. The Elements of Statistical Learning: Data Mining, Inference and Prediction. In Springer Series in Statistics, 2009.

(Continued)

*Primary Examiner* — Jeffrey A Gaffin
*Assistant Examiner* — Nathan Brown, Jr.
(74) *Attorney, Agent, or Firm* — Ryan, Mason & Lewis, LLP

(57) ABSTRACT

Techniques for assessing trust in information are provided. The techniques include collecting information from one or more information sources, detecting one or more inconsistencies in one or more statements from the information collected from the one or more sources, assigning a penalty to each information source involved in an inconsistency and a reward for each statement not involved in any inconsistencies, and using each assigned penalty and reward to perform an aggregation to assess trust in the collected information.

25 Claims, 2 Drawing Sheets

(56) References Cited

OTHER PUBLICATIONS

Long-Ying et al. Trust evaluation model of partners in complex products and systems based on rough set theory and support vector machine. 2009 16th International Conference on Management Science and Engineering (ICMSE), 148-154. IEEE, Piscataway, NJ, USA, 2009 20 Ref.

Seleznyov et al. Co-operation in the digital age: engendering trust in electronic environments. BT Technology Journal, vol. 22, No. 3, 95-105, Jul. 2004. 19 Ref.

Riegelsberger et al. The researcher's dilemma: Evaluating trust in computer-mediated communication. International Journal of Human-Computer Studies, vol. 58, No. 6, 759-781, Jun. 2003. 69 Ref.

Inbar, O. Graphical Representation of Statistical Information in Situations of Judgment and Decision-Making. Aug. 2007.

Antifakos et al. Towards Improving Trust in Context-Aware Systems by Displaying System Confidence. Sep. 2005.

Nelson et al. Quiet Calls: Talking Silently on Mobile Phones. Conference on Human Factors in Computing Systems Proceedings of the SIGCHI conference on Human factors in computing systems. Seattle, Washington, United States. pp. 174-181. 2001.

Cheng, J. et al. AIS-BN: An Adaptive Importance Sampling Algorithm for Evidential Reasoning in Large Bayesian Networks. In Journal of AI Research, 2000.

Cheng, P. et al. Fuzzy Multi-Level Security: An Experiment on Quantified Risk-Adaptive Access Control. In IEEE Symposium on Security and Privacy (SP 2007), 2007.

Dolby et al. Scalable semantic retrieval through summarization and refinement. In AAAI, pp. 299-304, 2007.

Dolby et al. Scalable highly expressive reasoner (sher). J. Web Sem., 7(4):357-361, 2009.

Dolby et al. Scalable cleanup of information extraction data using ontologies. In ISWC/ASWC, pp. 100-113, 2007.

Fokoue et al. The summary abox: Cutting ontologies down to size. In International Semantic Web Conference, pp. 343-356, 2006.

Josang et al. The beta reputation system. In 15th Conference on Electronic Commerce, 2002.

Kalyanpur. Debugging and Repair of OWL-DL Ontologies. PhD thesis, University of Maryland.

Ma et al. Towards a complete owl ontology benchmark. In ESWC, 2006, pp. 124-139, 2006.

McSherry. Privacy Integrated Queries: An Extensible Platform for Privacy Preserving Data Analysis. In ACM SIGMOD, 2009.

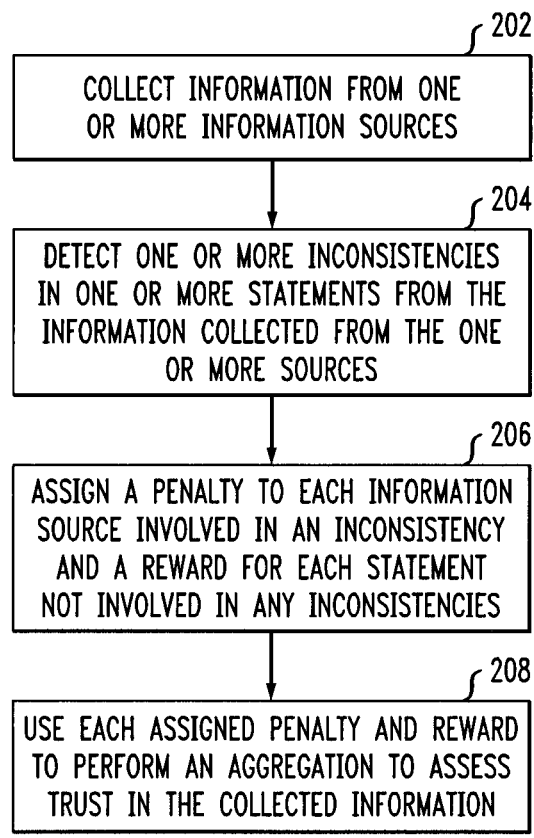
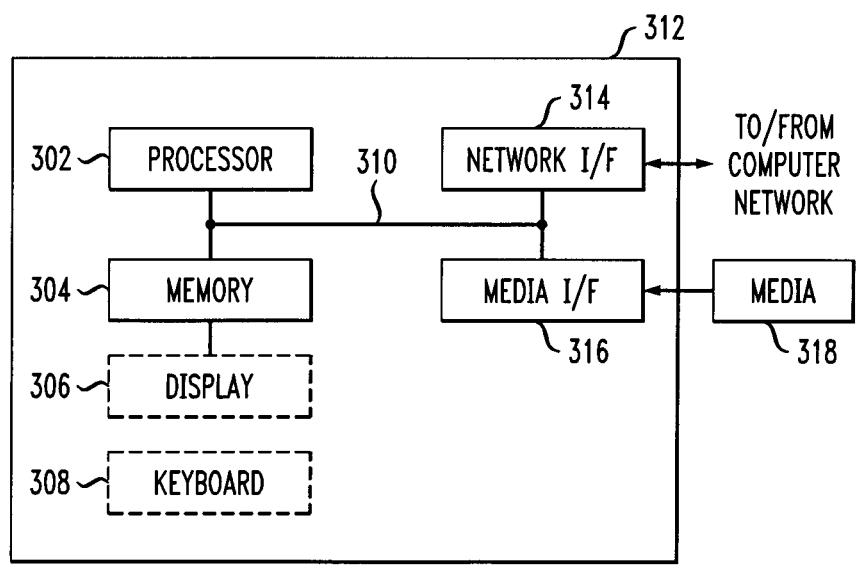

USING PENALTY AND REWARD TO AGGREGATE DATA TO ASSESS TRUST

GOVERNMENT CONTRACT

This invention was made with Government support under Contract No.: W911NF-06-3-0001 awarded by U.S. Army. The Government has certain rights in this invention.

FIELD OF THE INVENTION

Embodiments of the invention generally relate to information technology, and, more particularly, to trust assessment.

BACKGROUND OF THE INVENTION

In many sectors (for example, commercial, defense, etc.), information flows are becoming increasingly dynamic, voluminous and cross-organizational. For instance, in a social media information flow network, information from (un)trusted sources (for example, annotations on photos, user blogs, etc.) may be dynamically fused together (for example, by Web mashup applications) to construct information products (for example, Really Simple Syndication (RSS) feeds).

In such scenarios, a decision maker (a human or a software agent alike) is faced with the challenge of examining large volumes of information originating from heterogeneous sources with the goal of ascertaining trust in various pieces of information. A common data model subsumed by several trust computation models is the ability of an entity (for example, an information source) to assign a numeric trust score to another entity. In existing approaches, such pair-wise numeric ratings contribute to a (dis)similarity score (for example, based on $L_1$ norm, $L_2$ norm, cosine distance, etc.) which can be used to compute personalized trust scores or recursively propagated throughout the network to compute global trust scores.

A pair-wise numeric score-based data model, however, may impose severe limitations in several real-world applications. For example, suppose that information sources $\{S_1, S_2, S_3\}$ assert axioms $\phi_1$=all men are mortal, $\phi_2$=Socrates is a man and $\phi_3$=Socrates is not mortal, respectively. While there is an obvious conflict when all three axioms are put together, note that: (i) there is no pair-wise conflict, and (ii) there is no obvious numeric measure that captures (dis)similarity between two information sources.

This problem can become even more challenging because of uncertainty associated with real-world data and applications. Uncertainty can manifest itself in several diverse forms: from measurement errors (for example, sensor readings) and stochasticity in physical processes (for example, weather conditions) to reliability/trustworthiness of data sources. Regardless of its nature, a probabilistic measure for uncertainty can be adopted. Reusing the Socrates example above, each information source $S_i$ may assert the axiom $\phi_i$ with a certain probability $p_i$=0.6. Further, probabilities associated with various axioms need not be (statistically) independent. For instance, an information source may assert that an axiom $\phi_1$ holds with probability $p_1$ conditioned on the fact the axiom $\phi_2$ holds; the axiom $\phi_2$ may hold independent of any other axiom with probability $p_2$. In such situations, a challenge includes developing trust computation models for rich (beyond pair-wise numeric ratings) and uncertain (probabilistic) information.

SUMMARY OF THE INVENTION

Principles and embodiments of the invention provide techniques for assessing trust in information sources. An exemplary method (which may be computer-implemented) for assessing trust in information, according to one aspect of the invention, can include steps of collecting information from one or more information sources, detecting one or more inconsistencies in one or more statements from the information collected from the one or more sources, assigning a penalty to each information source involved in an inconsistency and a reward for each statement not involved in any inconsistencies, and using each assigned penalty and reward to perform an aggregation to assess trust in the collected information.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a flow diagram illustrating techniques for assessing trust in information, according to an embodiment of the invention; and FIG. 3 is a system diagram of an exemplary computer system on which at least one embodiment of the invention can be implemented.

DETAILED DESCRIPTION OF EMBODIMENTS

Figure 1:
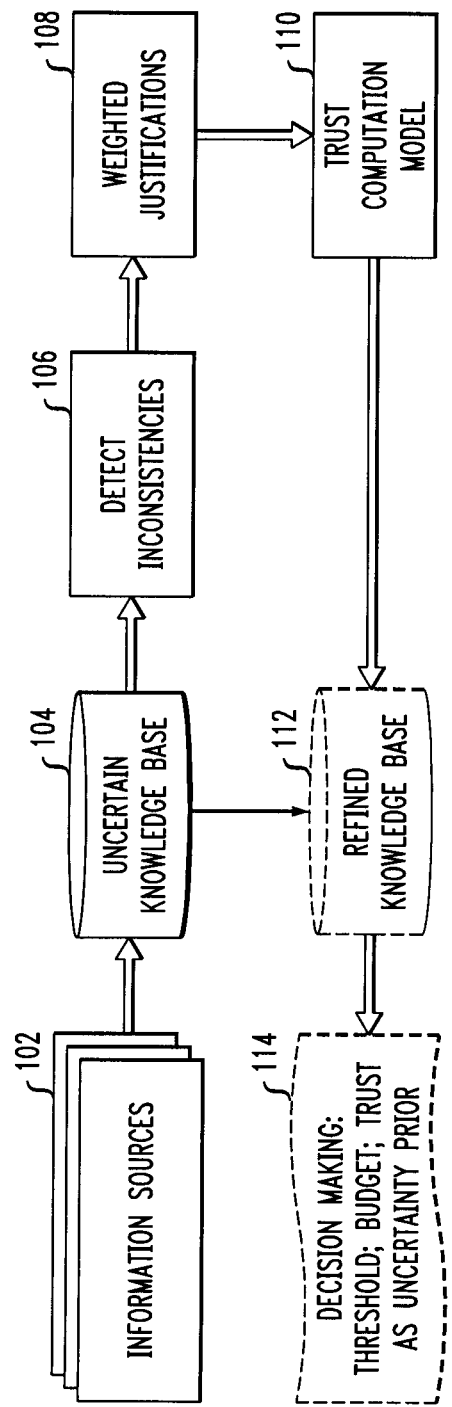
FIG. 1 is a diagram illustrating example architecture for assessing trust in uncertain information, according to an embodiment of the invention.

Principles of the invention include assessing trust in uncertain information via using inconsistencies. As noted herein, while existing approaches have traditionally focused on simple models for review and rating systems, one or more embodiments of the invention include implementing a trust model for rich, complex and uncertain information encoded using a probabilistic logic formalism such as a Bayesian Description Logics (BDL).

Further, one or more embodiments of the invention include implementing an iterative nature of determining a trust level based on a data model that combines both a to decidable subset of first order logic to capture the complexity of the information and a probabilistic model to represent uncertainty and extracts axioms that are responsible for the inconsistencies. Such an iterative nature of determining a trust level can also be based on a determined strength of credibility assigned to an information source based on updated trust assessment.

In the presence of inconsistencies, one or more embodiments of the invention include extracting justifications, that is, minimal sets of axioms that together imply an inconsistency. The trust computation model can propagate the degree of inconsistency as blames (or penalties) to the axioms contributing to the inconsistency via justifications. Additionally, using the updated trust values, one or more embodiments of the invention can include refining a belief in the credibility of each statement asserted by each information source.

In one or more embodiments of the invention, using BDL, information items are encoded as axioms of the form $A_x$: X where $A_x$ is a classical axiom (for example, an expressive and decidable subset of first-order logic) that is annotated with a Boolean random variable from a Bayesian network. Intuitively, $\phi$:X can be read as follows: the axiom $\phi$ holds when the Boolean random variable X is true. Dependencies between axioms (for example, $\phi_1$: $X_1$ and $\phi_2$: $X_2$) are captured using the Bayesian network that represents a set of random variables (that correspond to the annotations; for example, $X_1$, $X_2$) and their conditional probability distribution functions (for example, $Pr(X_2|X_1)$) via a directed acyclic graph (DAG).

One or more embodiments of the invention also include providing a trust computation model over uncertain information (for example, encoded as BDL axioms), enabling a computation of a degree of consistency ($0 \leq d \leq 1$) over an uncertain (probabilistic) knowledge base. Note that inconsistencies correspond to conflicts in information items reported by one or more information sources. One or more embodiments of the invention include assigning numeric weights to the degree of consistency using the possible world semantics.

Revisiting the Socrates example noted above, three probabilistic axioms $\phi_i$: $p_i$ ($\phi_i$: $p_i$ is a shorthand notation for $\phi_i$: $X_i$ and $Pr(X_i = true) = p_i$ for some independent random variable $X_i$) correspond to eight possible worlds (the power set of the set of axioms without annotations) corresponding to $\{\{\phi_1, \phi_2, \phi_3\}, \{\phi_1, \phi_2\}, \ldots, \emptyset\}$. For instance, the possible world $\{\phi_1, \phi_2\}$ corresponds to a world wherein all men are mortal, and Socrates is a man. Each possible world has a probability measure that can be derived from $p_i$ (in general, the probability measure can be computed as joint probability distributions over the random variables in the Bayesian network). By way of example, the probability of a possible world $\{\phi_1, \phi_2\}$ is given by $p_1 * p_2 * (1-p_3) = 0.6 * 0.6 * (1-0.6) = 0.144$. Indeed, it can be observed that the world $\{\phi_1, \phi_2, \phi_3\}$ is inconsistent, while the remaining seven possible worlds are consistent. This allows a computation of the degree of inconsistency of a knowledge base as the sum of the probabilities associated with possible worlds that are inconsistent.

In the presence of inconsistencies, as described herein, one or more embodiments of the invention include extracting justifications. This facilitates a computation of trust in information at the granularity of an axiom. Indeed one may aggregate trust scores at different levels of granularity; for example, axioms about a specific topic (for instance, birds), one information source (for example, John), groups of information sources (for example, all members affiliated with a particular educational society), a facet of an information source (for example, John as an ornithologist), etc.

Accordingly, in one or more embodiments of the invention, the trust computation model works as follows. First, a probability measure is computed for each justification as the sum of the probabilities associated with possible worlds in which the justification is present (namely, all the axioms in the justification are present). Second, the degree of inconsistency is partitioned across all justifications. For instance, if a justification $J_i$ is present in 80% of the possible worlds, then it is assigned four times the blame as a justification $J_2$ that is present in 20% of the possible worlds. Third, the penalty associated with a justification is partitioned across all axioms or sources in the justification using a biased (on prior beliefs in trust assessment) or an unbiased partitioning scheme. Note that there may be alternate approaches to derive trust scores from inconsistency measures and justifications, and the techniques detailed herein are flexible and extensible to such trust computation models.

In one or more embodiments of the invention, a naive implementation of a trust computation model requires all justifications. Exhaustive enumeration of justifications can be formulated as a tree traversal problem and an importance sampling approach can be developed to uniformly and randomly sample justifications without completely enumerating them. Unbiased sampling of justifications ensures that the malicious entities cannot game the trust computation model via, by way of example, selectively hiding justifications that include axioms from malicious entities (and thus evade penalties) from the sampling process. For scalability reasons, one or more embodiments of the invention can include a trust computation model that operates on a sample of justifications. A malicious entity may escape penalties due to incompleteness of justifications; however, across multiple inconsistency checks, a malicious entity is likely to incur higher penalties (and thus lower trust score) than the honest entities.

One or more embodiments of the invention can include implementing a probabilistic extension (for example, PSHER) to a publicly available highly scalable description logic (DL) reasoner (for example, SHER). To address potential exponential overhead, one or more embodiments of the invention can include using an error-bounded approximation algorithm to compute the degree of consistency of a probabilistic knowledge base and the weight of its justifications.

FIG. 1 is a diagram illustrating example architecture for assessing trust in uncertain information, according to an embodiment of the invention. By way of illustration, FIG. 1 depicts information sources 102, a knowledgebase of uncertain information 104, an inconsistency detection module 106, a weighted justification generation module 108, a trust computation model module 110, a refined knowledgebase 112 and a decision making module 114.

As depicted in FIG. 1, heterogeneous (in trustworthiness) information sources 102 provide information. Information items are stored in a knowledge base 104 that captures both the complexity of the information, through an encoding to a decidable subset of first order logic, and its uncertainty. A module 106 detects inconsistencies represented as justifications (that is, a minimal set of axioms responsible for an inconsistency), and justifications are weighted (via module 108) based on their likelihood. Penalties are assigned to information sources involved in inconsistencies. Information sources with axioms not involved in any inconsistency are rewarded for each such axiom. Also, rewards and penalties are fed to a trust model module 110, which performs an appropriate aggregation (for example, using a beta function). Further, the computed trust values are used to refine knowledgebase 104 to generate knowledgebase 112. Additionally, as a result of one or more embodiments of the invention, a standard decision making algorithm (for example, such as in connection with module 114) operating on refined knowledgebase 112 is more likely to reach improved or more useful decisions because the refined knowledgebase weighs the contributions of sources based on the trustworthiness of each source.

A Bayesian Network is a well-known probabilistic graphic model that encodes in a directed acyclic graph probabilistic dependencies between random variables. As used herein, the Bayesian network notations detailed herein are as follows. V: set of all random variables in a Bayesian network (for example, $V=\{V_1, V_2\}$. $D(V_i)$ (for some variable $V_i \in V$): set of values that $V_i$ can take (for example, $D(V_1)=\{0; 1\}$ and $D(V_2)=\{0; 1\}$). v: assignment of all random variables to a possible value (for example, $v=\{V_1=0, V_2=1\}$). v|X (for some $X \subseteq V$): projection of v that only includes the random variables in X (for example, $v|\{V_2\}=\{V_2=1\}$). D(X) (for some $X \subseteq V$): Cartesian product of the domains $D(X_i)$ for all $X_i \in X$.

A probabilistic axiom over a Bayesian Network (BN) over a set of variables V is of the form $\phi$:e, where $\phi$ is a classical DL axiom, and the probabilistic annotation e is an expression of one of the following forms: X=x or X≠x where $X \subseteq V$ and $x \in D(X)$. Intuitively, every probabilistic annotation represents a scenario (or an event) which is associated with the set of all value assignments V=v with $v \in D(V)$ that are compatible with X=x (that is, v|X=x) and their probability value $Pr_{BN}(V=v)$ in the Bayesian network BN over V. Accordingly, the semantics of a probabilistic axiom $\phi$:X=x is as follows: when event X=x occurs then $\phi$ holds.

A probabilistic knowledge base K=(A, T, BN) includes a Bayesian Network over a set of random variables V, as well as a set of probabilistic Abox axioms A of the form $\phi$:e, where $\phi$ is a classical Abox axiom. In classical DL, an Abox axiom is an axiom describing the propriety of instances in the knowledge base. In SHIN DL (the core of OWL standard), for example, an Abox axiom is expressed in one of two forms: 1) C(a), stating that the individual a is an instance of the class C (for example, Man(Socrates) asserts that Socrates is an instance of the class Man); or 2) R(a, b), stating that the individual a is related to b through the relationship R (for example, is StudentOf(Plato; Socrates) asserts that the individual Plato is related to Socrates by the relation is StudenOf).

T in the definition of K=(A, T, BN) denotes a set of probabilistic Tbox axioms T of the form $\phi$:e, where $\phi$ is a classical Tbox axiom. In classical DL, a Tbox axiom is an axiom describing relationship between concepts and relations in the domain of discourse. The kinds of constructors allowed in Tbox axioms determine the expressivity and the computation properties of a particular DL. For example, in the very expressive SHIN DL, new concepts can be defined as the intersection, complement, or union of existing concepts, and by using universal or existential quantification on existing relations. The Tbox may also define constraints on relations. For example, a relation can be defined as transitive, inverse of another relation, symmetric, etc.

$\phi$:p, where $p \in [0; 1]$, can be used to directly assign a probability value to a classical axiom $\phi$. This is an abbreviation for $\phi$:$X_0$=true, where $X_0$ is a Boolean random variable in the BN independent of all other variables, not mentioned in any other annotation, and such that $Pr_{BN}(X_0=true)=p$. For instance, the following example illustrates how this formalism can be used to describe road conditions that are influenced by probabilistic events such as weather conditions:

$T=\{$SlipperyRoad $\sqcap$ OpenedRoad $\sqsubseteq$ HazardousCondition, Road $\sqsubseteq$ SlipperyRoad:Rain=true$\}$ $A=\{$Road(route9A),OpenedRoad(route9A): TrustSource=true$\}$ In this example, the Bayesian network BN includes three variables: Rain, a Boolean variable which is true when it rains; TrustSource, a Boolean variable which is true when the source of the axiom OpenedRoad(route9A) can be trusted; and Source, a variable which indicates the provenance of the axiom OpenedRoad(route9A). The probabilities specified by BN are as follows:

$Pr_{BN}$(TrustSource=true|Source='Mary')=0.8
$Pr_{BN}$(TrustSource=true|Source='John')=0.5
$Pr_{BN}$(Rain=true)=0.7, $Pr_{BN}$(Source='John')=1

The first Tbox axiom asserts that an opened road that is slippery is a hazardous condition. The second Tbox axiom indicates that when it rains, roads are slippery. Finally, the Abox axioms assert that route9A is a road and, assuming that the source of the statement OpenedRoad(route9A) can be trusted, route9A is opened.

Probability values computed through the Bayesian network can, for instance, propagate to the DL side as follows. Each assignment v of all random variables in BN (for example, v={Rain=true, TrustSource=false, Source='John'}) corresponds to a primitive event ev (or a scenario). A primitive event ev is associated, through BN, to a probability value $p_{ev}$ and a classical DL KB $K_{ev}$ which includes all classical axioms annotated with a compatible probabilistic annotation (for example, SlipperyRoad $\sqcap$ OpenedRoad $\sqsubseteq$ HazardousCondition, Road $\sqsubseteq$ SlipperyRoad, Road(route9A)). The probability value associated with the statement $\phi$ (for example, $\phi$=HazardousCondition (route9A)) is obtained by summing $p_e$, for all ev such that the classical KB $K_{ev}$ entails $\phi$ (for example, Pr(HazardousCondition(route9A))=0.35).

The ability to detect contradicting statements and measure the relative importance of the resulting conflict is a prerequisite to properly estimating the (dis)similarity between information sources providing rich, complex and probabilistic assertions. Those assertions can be viewed, for example, as axioms in a Bayesian Description Logics Knowledge base.

For $v \in V$, it can be noted that v is compatible with the probabilistic annotation X=x (resp. X≠x), denoted v|=X=x (resp. v|=X≠x), iff v|X=x (resp. v|X≠x). A probabilistic annotation e represents a scenario (or an event) which is associated with the set of all value assignments V=v with $v \in D(V)$ that are compatible with e. The probabilistic axiom of the form T:e (resp. $\phi$:>) can be abbreviated as e (resp. $\phi$). Also, an annotated interpretation can be defined as an extension of a first-order interpretation by assigning a value $v \in D(V)$ to V. An annotated interpretation $I=(\Delta^I, .^I)$ is defined in a similar way as a first-order interpretation except that the interpretation function $.^I$ also maps the set of variables V in the Bayesian Network to a value $v \in D(V)$. An annotated interpretation I satisfies a probabilistic axiom $\phi$:e, denoted I|=$\phi$:e, iff ($V^I$|=e implies I|=$\phi$).

As detailed herein, the notion of probabilistic interpretation can be defined as a finite probabilistic distribution over annotated interpretations. Accordingly, the definition can include the following. A probabilistic interpretation Pr is a probability function over the set of all annotated interpretations that associates only a finite number of annotated interpretations with a positive probability. The probability of a probabilistic axiom $\phi$:e in Pr, denoted Pr($\phi$:e), is the sum of all Pr(I) such that I is an annotated interpretation that satisfies $\phi$:e. A probabilistic interpretation Pr satisfies (or is a model of) a probabilistic axiom $\phi$:e iff Pr($\phi$:e)=1. Also, Pr satisfies (or is a model of) a set of probabilistic axioms F iff Pr satisfies all $f \in F$.

Further, the notion of consistency of a probabilistic knowledge base can be defined as, for example, the following. The probabilistic interpretation Pr satisfies (or is a model of) a probabilistic knowledge base K=(T, A, BN) iff (i) Pr is a model of T∪A and (ii) $Pr_{BN}(V=v)=\Sigma_{I\ s.t.V^I=v} Pr(I)$ for all $v \in D(V)$. Also, KB is consistent iff it has a model Pr. Additionally, it can be noted that one or more conditions in the previous definition ensure that the sum of probability values for annotated interpretations mapping V to v∈D(V) is the same probability value assigned to V=v by the Bayesian Network.

In the previously presented semantics for a Bayesian DL, consistency is still categorically defined. One or more embodiments of the invention can address this significant shortcoming using a refined semantics which introduces the notion of degree of inconsistency.

First, using a simple example, the intuition behind the notion of degree of inconsistency for a knowledge base can be illustrated. Let KB be the probabilistic knowledge base defined as follows:

KB=(T, A∪{T⊑⊥: X=true}, BN)

where T is a classical Tbox and A is a classical Abox such that the classical knowledge base cKB=(T; A) is consistent; BN is a Bayesian Network over a single Boolean random variable X, and the probability $PrBN(X=true)=10^{-6}$ that X is true is extremely low. Under past probabilistic extensions to DL, the KB is completely inconsistent, and nothing meaningful can be inferred therefrom. This stems from the fact that when X is true, the set of classical axioms that must hold (that is, T∪A∪{T⊑⊥}) is inconsistent. However, the event X=true is extremely unlikely, and, therefore, it is unreasonable to consider the whole probabilistic KB inconsistent. Intuitively, the likelihood of events, whose set of associated classical axioms is inconsistent, represents the degree of inconsistency of a probabilistic KB.

One or more embodiments of the invention include an inconsistency-tolerant refinement of the semantics of a Bayesian DL. The notion of degree of inconsistency can be defined as follows. An annotated interpretation I is an annotated model of a probabilistic KB K=(T, A, BN) where BN is a Bayesian Network over a set of variables V iff for each probabilistic axiom φ:e, I satisfies φ:e.

In order to measure the degree of inconsistency, one or more embodiments of the invention include finding all primitive events v (that is, elements of the domain D(V) of the set of variables V) for which there are no annotated models I such that $V^I=v$. For a probabilistic KB K=(T, A, BN) where BN is a Bayesian Network over a set of variables V, the set of inconsistent primitive events, denoted U(K), is the subset of D(V), the domain of V, such that v∈U(K) iff there is no annotated model I of K such that $V^I=v$.

Additionally, the degree of inconsistency of a probabilistic knowledge base is defined as the probability of occurrence of an inconsistent primitive event. Let K=(T, A, BN) be a probabilistic KB such that BN is a Bayesian Network over a set of variables V. The degree of inconsistency of K, denoted DU(K), is a real number between 0 and 1 defined as follows:

$$DU(K) = \sum_{v \in U(K)} Pr_{BN}(V = v)$$

A probabilistic interpretation Pr (as detailed above) satisfies (or is a model of) a probabilistic KB K=(T;A;BN) to a degree d, 0<d≤1 iff the following holds:
 (i) Pr is a model as T∪A;
 (ii) for v∈V, $$\left(\sum_{x \text{ s.t. } V^I = v} Pr(I)\right) = \begin{cases} 0 & \text{if } v \in U(K) \\ \dfrac{Pr_{BN}(V=v)}{d} & \text{if } v \notin U(K) \end{cases}$$

(iii) d=1−DU(K)

A probabilistic knowledge base K=(T, A, BN) is consistent to the degree d, with 0<d≤1, iff there is a probabilistic interpretation that satisfies K to the degree d. It is completely inconsistent (or satisfiable to the degree 0), iff DU(K)=1.

Informally, by assigning a zero probability value to all annotated interpretations corresponding to inconsistent primitive events, they can be removed from consideration, and it requires that the sum of the probability value assigned to interpretations mapping V to v for v∉U(K) is the same as the joint probability distribution PrBN defined by BN with a normalization factor d. In practice, by way of example, computing the degree of inconsistency of a Bayesian DL KB can be reduced to classical description logics consistency check as described herein. Further, a notation used herein can be described as follows:

Notation 1. Let K=(T, A, BN) be a probabilistic knowledge base. For every v∈D(V), let $T_v$ (resp., $A_v$) be the set of all axioms φ for which there exists a probabilistic axiom φ:e in T (resp., A), such that v|=e. $K_v$ denotes the classical knowledge base $(T_v;A_v)$. Informally, $K_v$ represents the classical knowledge base that must hold when the primitive event v occurs. $K_T$ denotes the classical KB obtained from K after removing all probabilistic annotations: $K_T=(\cup_{v\in D(V)}T_v, \cup_{v\in D(V)} A_v)$.

Theorem 1. Let K=(T, A, BN) be a probabilistic knowledge base. K is consistent to the degree d iff.

$$d = 1 - \sum_{v \text{ s.t. } K_v \text{ inconsistent}} PrBN(V = v)$$

Additionally, the proof of Theorem 1 is a consequence of Lemma 1, which includes the following: Let K=(T, A, BN) be a probabilistic knowledge base. v∈U(K) iff $K_v$ is inconsistent.

Also, in one or more embodiments of the invention, a conflict or contradiction is formally captured by the notion of an inconsistency justification, minimal inconsistency preserving subset of the KB. Accordingly, this can be defined as follows:

Let K=(T, A, BN) be a probabilistic KB consistent to the degree d such that BN is a Bayesian Network over a set of variables V. J is an inconsistency justification iff. 1) J⊆(T,A), 2) (J, BN) is probabilistic KB consistent to the degree d' such that d'<1, and 3) for all J'⊂J, (J', BN) is probabilistic KB consistent to the degree 1 (that is, (J', BN) is completely consistent).

The degree DU(J) of an inconsistency justification J is defined as the degree of inconsistency of the probabilistic KB made of its axioms: DU(J)=DU((J, BN)). Additionally, justification computation in a probabilistic knowledge base reduces to justification computation in classical knowledge bases as shown by the following theorem:

Theorem 2. Let K=(T, A, BN) be a probabilistic knowledge base, where BN is a Bayesian network over a set V of random variables. J is an inconsistency justification of K iff there exists v∈D(V) such that $Pr_{BN}(V=v)>0$ and $J_T$, the classical KB obtained from J by removing all probabilistic annotations, is an inconsistency justification of $K_v$.

Furthermore, the degree, DU(J), of an inconsistency justification J is as follows:

$$DU(J) = \sum_{v \text{ s.t. } J_T \subseteq K_v} Pr_{BN}(V = v).$$

Accordingly, once a classical justification has been found in a classical KB $K_v$ for $v \in D(V)$, the degree of the corresponding probabilistic justification can be obtained through simple set inclusion tests.

Theorems 1 and 2 provide a concrete mechanism to compute a degree of inconsistency of a probabilistic KB, and a degree of inconsistency of a justification. However, they can be highly intractable because they require an exponential number, in the number of variables in BN, of corresponding classical tasks. As described herein, one or more embodiments of the invention include addressing this issue.

As further detailed herein, one or more embodiments of the invention include error-bound approximate reasoning. A Bayesian network-based approach lends itself to fast Monte Carlo sampling algorithms for scalable partial consistency checks and query answering over a large probabilistic knowledge base. In particular, one or more embodiments of the invention include using a forward sampling approach to estimate $pr = \Sigma_{v \in \Pi} Pr_{BN}(V=v)$ (recall theorem 1 and 2) that generates a set of samples $v_1, \ldots, v_n$ from BN (each sample is generated in time that is linear in the size of BN) such that the probability pr can be estimated as $$pr_n = \frac{1}{n} * \sum_{i=1}^{n} I(v_i \in \Pi),$$

where $I(z)=1$ if z is true; 0 otherwise. It can be illustrated that $pr_n$ is an unbiased estimator of pr such that $\lim_{n \to \infty} \sqrt{n}*(pr_n - pr) \to N(0, \sigma_z^2)$, where $N(\mu, \sigma^2)$ denotes a normal distribution with mean $\mu$ and variance $\sigma^2$ and $\sigma_z^2$ denotes the variance of $I(z)$ for a Boolean variable z.

In one or more embodiments of the invention, the maximum variance $\sigma_{z_{max}}^2$ for a Boolean random variable can be 0.25. Hence, the sample size n which guarantees an absolute error of $\in$ or less with a confidence level $\eta$ is given by the following formula:

$$n = \frac{2 * (\text{erf}^{-1}(\eta))^2 * \sigma_{z_{max}}^2}{\in^2},$$

where er $f^1$ denotes the inverse Gauss error function. For example, to compute the degree of consistency of a probabilistic KB within +/−5% (resp. 3%) error margin with a 95% confidence, the sample size n=396 (resp. n=1089) is necessary.

Further, one or more embodiments of the invention can include sampling justifications in a classical KB. It may be desirable, for example, to find all classical justifications. Computing a single justification can be done, for example, by 1) using a tracing technique to obtain a significantly small set S of axioms susceptible to being responsible for the detected inconsistency discovered by a single consistency test, and 2) performing additional |S| consistency check on knowledge bases of size at most |S−1| to remove extraneous elements from S. Further, a scalable approach to efficiently computing a large number of (but not all) justifications in large and expressive KBs can include summarization and refinement, with the idea including looking for patterns of justifications in a dramatically reduced summary of the KB, and retrieving concrete instances of these patterns in the real KB.

However, computing all justifications is known to be intractable even for realistic small and medium size expressive knowledge bases. As such, starting from a single justification, a Reiter's Hitting Tree can be constructed in order to get all justifications. Accordingly, for example, in one or more embodiments of the invention, starting from the first justification $J = \{2, 3, 4\}$ computed in the KB K (J is set to be the root $v_0$ of the tree), the algorithm arbitrary selects an axiom in J, say 2, and creates a new node w with an empty label in the tree and a new edge $<v_0, w>$ with axiom 2 in its label. The algorithm then tests the consistency of the K−{2}. If it is inconsistent, a justification J' is obtained for K−{2}, say {1, 5}, and it is inserted in the label of the new node w. This process is repeated until the consistency test is positive, in which case, the new node can be marked with a check mark. As an optimization, one or more embodiments of the invention can include stopping exploring a super set of paths discovered earlier and marked the node with the label 'X'.

In order to avoid the high cost associated with exploring the entire Hitting Set Tree to find all conflicts, one or more embodiments of the invention can include finding the first K conflicts by exploring the Reiter's Hitting Set Tree (HST) until K distinct justifications are found. One potential problem with this approach is that nodes in the HST are not equally likely to be selected with such a scheme: the probability $\Pi(v_d)$ of a node $v_d$ in a path $<v_0 v_1 \ldots v_d>$ to be selected is:

$$\Pi(v_d) = \prod_{0 \leq i \leq d} (1/|v_i|),$$

where $|v_i|$ denotes the number of axioms in the justification $v_i$. As a result, a source can potentially use the bias in the sampling to 'hide' its conflicts.

However, because the exact nature of the introduced biased is known, one or more embodiments of the invention can fix it by, for example, selecting K nodes in the HST by exploring the HST in the normal way, but each time a node $v_i$ is encountered, generating a random number r uniformly from [0,1] if $r \leq \min(\beta/\Pi(v_i), 1)$ where $\beta$ is a strictly positive real number. The following Proposition illustrates that, in this approach, for a sample of K HST nodes, if $\beta$ is properly chosen, then the expected number of time each node is selected is identical for all nodes.

Proposition 1. Let $N_v$ denotes the random variable representing the number of times the node v appears in a HST sample of size K. The expected value $E(N_v)$ of $N_v$ is as follows:

$$E(N_v) = \begin{cases} K * \Pi(v) & \text{if } \beta \geq \Pi(v) \\ K * \beta & \text{if } 0 < \beta < \Pi(v) \end{cases}$$

According to Proposition 1, if $\beta$ is chosen such that $0 < \beta < \min_{v \in HST}(\Pi(v))$, then the expected number of times a node in the HST is select is constant. However, the minimum value of $\Pi(v)$ depends on the tree structure (branching factor and maximum depth), and cannot be computed precisely without exploring the entire HST. Accordingly, one or more embodiments of the invention can include using the following slightly biased sampling approach to select K nodes (the trade-off between computation cost and bias in the sample is controlled by a parameter of the algorithm, a):

1. Let visited denote the set of visited nodes. Set visited to $\emptyset$.

2. Explore the HST in the normal way, and add the first max(K−|visited|, 1) nodes visited to visited.

3. Let $\Pi_{min}$ be the minimum value of $\Pi(v)$ for $v \in$ visited.

4. Set $\beta = \Pi_{min}/\alpha$, where $\alpha>1$ is a parameter of the sampling algorithm which controls the trade-off between computation cost and biased in the sampling. Higher values of $\alpha$, while reducing the bias in the sampling, increase the computation cost by reducing the probability of a node selection; hence, increasing the length of the tree traversal.

5. For each $v \in$ visited, add it to the result set RS with a probability of $\beta/\Pi(v)$.

6. If $|RS|<K$ and the HST has not been completely explored, then set $RS=\emptyset$ and continue the exploration from step 2; otherwise return RS.

Further, although the new sampling nearly uniformly selects nodes, there still is a potential bias with respect to justifications because some justifications may appear more often in the HST. The bias introduced for a justification is proportional to the fraction of nodes in which it appears. One or more embodiments of the invention can include correcting for such a bias in the same way as the one introduced by $\Pi(v)$ was corrected. Accordingly, one or more embodiments of the invention can include using the nearly uniform sample over nodes in HST to estimate the fraction of nodes in which a justification appears.

As detailed herein, one or more embodiments of the invention include a trust computation model. The problem of assessing trust in a set IS that includes n information sources can be formalized as follows. The trust value assumed or known prior to any statement made by an information source i is specified by a probability distribution PrTV(i) over the domain [0, 1]. For example, a uniform distribution is often assumed for new information source for which there is no prior knowledge. Statements made by each information source i is specified in the form of a probabilistic knowledge base $K_i=(T^i, A^i, BN^i)$. The knowledge function C maps an information source i to the probabilistic knowledge base $K_i$ capturing all of its statements. The trust update problem is a triple (IS, PrTV, C) where IS includes information sources, PrTV is a prior trust value function over IS which maps a source i to a probability distribution PrTV(i) over the domain [0, 1], and C is a knowledge function over IS. A solution to a trust update problem is given by the posterior trust value function PoTV. PoTV maps an information source i to a probability distribution over the domain [0, 1], which represents a new belief in the trustworthiness of i after processing statements in $\cup_{j \in IS} C(j)$.

One or more embodiments of the invention include performing a trust computation via modeling prior and posterior trust of a source i (PrTV(i) and PoTV(i)) using a beta distribution $\beta(\alpha; \beta)$. Intuitively, the reward parameter $\alpha$ and the penalty parameter $\beta$ correspond to good (non-conflicting) and bad (conflicting) axioms contributed to an information source, respectively. The trust assessment problem now reduces to that of (periodically) updating the parameters $\alpha$ and $\beta$ based on the axioms contributed by the information sources. The model can be bootstrapped by setting PrTV(i) to $\beta(1; 1)$, a uniform and random distribution over [0, 1], when there is no prior knowledge.

One or more embodiments of the invention include using a reward structure wherein an information source receives unit reward for every axiom it contributes if the axiom is not in a justification for inconsistency. A scaling parameter $\Delta$ can be used to control the relative contribution of reward and penalty to the overall trust assessment, and one or more embodiments of the invention can include setting $\Delta>1$, that is, a penalty has higher impact on trust assessment than the reward.

As described herein, one or more embodiments of the invention include providing solutions to construct (a random sample) justifications that explain inconsistencies in a knowledge base. Further, a justification J can be associated with a weight DU(J) that corresponds to the possible worlds in which the justification J holds. For each (randomly sampled) justification $J_i$, one or more embodiments of the invention can include associating a penalty $\Delta(J_i)=\Delta*DU(J_i)$.

The trust computation model traces a justification $J_i$, to conflicting information sources $S=\{S_{i1}, \ldots, S_{i_n}\}$ (for some $n \geq 2$) that contributed to the axioms in $J_i$. Three example solutions to partition $\Delta(J_i)$ units of penalty amongst the contributing information sources as shown below, and $t_{i_j}$ is used to denote the expectation of $PrTV(i_j)$ for an information source $i_j$, that is, $$t_{i_j} = \frac{\alpha_{i_j}}{\alpha_{i_j} + \beta_{i_j}}.$$

$$\Delta(S_{i_j}) = \begin{cases} \dfrac{\Delta(J_i)}{n} & \text{unbiased} \\[2ex] \dfrac{\Delta(J_i)}{n-1} * \left(1 - \dfrac{t_{i_j}}{\sum_{k=1}^{n} t_{i_k}}\right) & \text{biased by prior trust} \\[2ex] \Delta(J_i) * \dfrac{\dfrac{1}{t_{i_j}}}{\sum_{k=1}^{n} \dfrac{1}{t_{i_k}}} & \text{biased by min prior trust} \end{cases}$$

The unbiased version distributes penalty for a justification equally across all conflicting information sources, and the biased versions tend to penalize less trustworthy sources more. It may appear, by way of example, that one possible solution can weigh the penalty for a source $S_{i_j}$ by the sum of the expected prior trust values for all the other conflicting sources, namely, (S) $\{S_{i_j}\}$. For instance, if there are three information sources $S_{i_1}, S_{i_2},$ and $S_{i_3}$ with expected prior trust $t_{i_1}=0.1$ and $t_{i_2}=t_{i_3}=0.9$, then the penalty for source $i_1$ must be weighted by $$\frac{1}{2} * \frac{0.9 + 0.9}{0.1 + 0.9 + 0.9} = 0.47,$$

while that of sources $i_2$ and $i_3$ must be weighted by 0.265. This approach penalizes the less trustworthy source more than the trusted sources. However, note that even when the prior trust in $i_1$ becomes arbitrarily close to zero, the penalty for the honest source $i_2$ and $i_2$ is weighted by 0.25. A close observation reveals that a malicious source (with very low prior trust) may penalize honest nodes (with high prior trust) by simply injecting conflicts that involve the honest nodes. For instance, if sources $i_2$ and $i_3$ assert axioms $\emptyset_2$ and $\emptyset_3$, respectively, then the malicious source $i_1$ can assert an axiom $\emptyset_1 = \neg \emptyset_2 \vee \neg \emptyset_3$ and introduce a justification spanning all the three sources. Since the penalty for $i_2$ is weighted by the prior trust in $i_3$ (and vice-versa), the honest sources end up penalizing each other.

In one or more embodiments of the invention, the penalties for a justification are weighted by the minimum value of prior trust amongst all of the conflicting information sources. Trivially, given n−1 honest sources asserting axioms $\emptyset_2, \emptyset_3, \ldots, \emptyset_n$, a single malicious source may assert axiom $\neg \emptyset_2 \vee \ldots \vee \neg \emptyset_n$; hence, penalties are weighed by the weakest link that could have created an inconsistency (namely, the source with the least prior trust). One or more embodiments of the invention include adopting a min expected prior trust based penalty distribution wherein a source $S_{i_j}$ is weighted in proportion to $$\frac{\frac{t_{min}}{t_{i_j}}}{\sum_{k=1}^{n} \frac{t_{min}}{t_{i_k}}},$$

where $t_{min} = \min^{1 \leq j \leq n} \{t_{i_j}\}$.

To evaluate one or more embodiments of the invention, an example embodiment was developed, PSHER, that extends SHER reasoner to support Bayesian SHIN (the core of OWL 1.0 DL) reasoning. SHER was chosen for its ability to scale reasoning to very large and expressive knowledge bases, and to efficiently detect a large number of inconsistency justifications in a scalable way. As such, the example embodiment reduced the problem of computing justifications on a probabilistic KB to detecting those justifications on classical KBs using SHER.

Axioms asserted by various information sources in the experiments were taken from the UOBM benchmark, which was modified to SHIN expressivity, and its Abox was modified by randomly annotating half of the axioms with probability values. Furthermore, additional Abox assertions were inserted in order to create inconsistencies involving axioms in the original UOBM KB. Note that not all axioms in the original UOBM KB end up being part of an inconsistency, which introduces an asymmetry in information source's knowledge (for example, a malicious source is not assumed to have complete knowledge of all axioms asserted by other sources).

Experiments were conducted on one department of UOBM1 (including added inconsistent axioms and excluding duplication across sources, this representing about 74000 axioms). It is noted that PSHER could scale as well as SHER through parallelism because each probabilistic reasoning task performed by PSHER is reduced to the corresponding classical task evaluated using SHER on n classical KBs, where n depends on the desired precision as detailed herein. Also, experiments were run on a 64 bit 3.2 GHz AMD 8-core processor 32G RAM Linux machine (only two cores were used: one for the PSHER process, and the other for the DB2 process), and the java heap size was limited to 2G.

In one or more experiments, four types of information sources were considered:
 Perfect honest sources (PHS) whose axioms are taken from the UOBM KB before the introduction of inconsistencies.
 Purely malicious sources (PuMS) whose axioms are selected from the ones added to UOBM KB in order to create inconsistencies.
 Imperfect honest sources (IHS) having the majority of their axioms (more than 90%) from the UOBM KB before the introduction of inconsistencies. This category of sources allows simulation of the behavior of one or more embodiments of the invention when honest sources are faced with measurement errors or commit honest mistakes.
 Partially malicious sources (PaMS) are such that between 10% and 90% of their axioms are selected from the axioms added to UOBM KB to create inconsistency. They are primarily used to simulate the behavior of one or more embodiments of the invention when malicious sources use an oscillating behavior to milk our trust computation scheme.

Axioms were randomly assigned to various sources without violating the proportion of conflicting versus non-conflicting axioms for each type of source.

One experiment measured the impact of a single purely malicious source (PuMS) on the trust values of nine perfect honest sources. The PuMS asserted more and more incorrect axioms contradicting PHS's axioms (at each step, each source asserted about 100 additional statements until all their axioms have been asserted) while the PHSs continued to assert more of what can be considered correct axioms. Axioms asserted by the PuMS do not necessarily yield an inconsistency in the same step in which they are asserted, but, by the end of the simulation, they are guaranteed to generate an inconsistency. For this experiment, there was no duplication of axioms across sources, and no prior knowledge about the trustworthiness of the sources was assumed. Because each justification created by the malicious source also involves at least one PuMS, initially, it manages to drop significantly the absolute trust value of some PHSs (up to 50% in one example). However, a PuMS hurts its trust value significantly more than it hurts those of other sources. As a result of the fact that one or more embodiments of the invention are such that less trustworthy sources get assigned a large portion of the penalty for a justification, the single PuMS eventually ends up receiving almost all of the penalty for its inconsistencies, which allows the trust values of honest sources to recover. Due to information asymmetry (malicious sources do not have complete knowledge of information in other sources and thus cannot contradict all the statements of a PHS), one or more embodiments of the invention remain robust in the sense that honest sources would recover even when the proportion of PuMS increases.

In previous experiments, although honest sources manage to recover from the attack, they can still be severely hurt before the credibility of the malicious sources decreased enough to enable a recovery for honest sources. This problem can be addressed in two ways: 1) by increasing the degree of redundancy between sources; and/or 2) by taking into account a priori knowledge of each source.

In case of moderate to high redundancy between sources, a justification generated by a malicious source to compromise a honest source is likely to hurt the malicious source much more than the honest source because the axioms in the justification coming from the honest source are likely to be confirmed by (that is, duplicated in) other honest sources. Therefore, the malicious source will be involved in as many justifications as there are corroborating honest sources, while each corroborating source will be involved in a single justification.

In another experiment, it is assumed that there is a high a priori confidence in the trustworthiness of the honest sources: the prior distribution of the trust value of PHS in that experiment is a beta distribution with parameter $\alpha=2000$ and $\beta=1$. As expected, the damage inflicted by the malicious source is significantly reduced compared to a situation where no prior knowledge about the source trustworthiness was taken into account.

Another experiment evaluated the behavior of one or more embodiments of the invention when partially malicious sources use an oscillating behavior. The malicious sources alternate periods where they assert incorrect axioms, contradicting axioms asserted in the same period by other sources, with periods in which they assert only correct axioms. As opposed to previous experiments where malicious axioms asserted in a step were not guaranteed to yield an inconsistency in the same step, in the oscillation experiments, the inconsistency is observed at the same step. In absence of prior knowledge, the trust values of partially malicious sources (PaMS) and honest sources drop significantly at the first period in which incorrect axioms are stated. However, malicious sources, which due to information asymmetry, can only contradict a limited set of statements from honest sources, never recover significantly, while honest sources quickly improve their trust values by asserting more axioms not involved in conflicts. As in the previous non-oscillating experiments, the negative impact on honest sources can be reduced considerably through axiom duplication and prior strong confidence in their trustworthiness.

Based on the requirements of the application domain, a simple threshold based scheme (trust>threshold) or a budget based scheme can be adopted to make decisions that leverage the trust score computed by one or more embodiments of the invention. Alternately, information items in the probabilistic knowledge base can be refined based on the trustworthiness of the information sources. By way of example, one or more embodiments of the invention can include using all axioms contributed by information sources whose trust score is below a threshold; or one or more embodiments of the invention can include replacing an axiom Ø:X provided by an information source with trust score $\tau$ ($0<\tau<1$) with Ø:Y, where Y is a new random variable introduced in the Bayesian network such that $Pr(Y=true|X=true)=Pr(Y=false|X=false)=\tau$ and $Pr(Y=true|X=false)=Pr(Y=false|X=true)=1-\tau$.

FIG. 2 is a flow diagram illustrating techniques for assessing trust in information, according to an embodiment of the present invention. Step 202 includes collecting information from one or more information sources. This step can be carried out, for example, using an uncertain knowledge base. The information sources can be, for example, heterogeneous with respect to trustworthiness. Additionally, the information can be represented as a simple first order logic statement, and/or a statement from a probabilistic extension of first order logic in order to capture uncertain information.

Step 204 includes detecting one or more inconsistencies in one or more statements from the information collected from the one or more sources. This step can be carried out, for example, using an inconsistency detection module. An inconsistency can be represented as a justification, wherein a justification includes a minimal set of one or more axioms responsible for an inconsistency. Also, a justification can be weighted based on its likelihood of being selected if a selection process was random.

Detecting inconsistencies in statements from the information collected can include the steps of representing a problem of justification computation as a traversal of a search tree, and uniformly and randomly selecting one or more justifications from the search tree without performing a full traversal.

Step 206 includes assigning a penalty to each information source involved in an inconsistency and a reward for each statement not involved in any inconsistencies. This step can be carried out, for example, using a weighted justification generation module.

Step 208 includes using each assigned penalty and reward to perform an aggregation to assess trust in the collected information. This step can be carried out, for example, using a trust computation model module. Using each assigned penalty and reward to perform an aggregation to assess trust in the collected information can include, for example, providing each penalty and reward to a trust model for performance of an aggregation (for example, using a beta function). Additionally, a trust assessment of an information source can be based on whether one or more statements of the source are among the one or more detected inconsistencies.

The techniques depicted in FIG. 2 can also include storing information in a knowledge base that captures complexity of the information through an encoding to a decidable subset of first order logic, and uncertainty of the information. Further, one of more embodiments of the invention can include using trust assessment to refine the knowledge base, as well as to enhance information quality via determining a strength of credibility for each information source. One or more embodiments of the invention can additionally use trust assessment to classify information sources wherein an inconsistency involves two or more information sources, wherein a penalty is asymmetrically assigned to an information source based on prior trust of the information source, and/or wherein a less trustworthy source is assigned a higher penalty.

The techniques depicted in FIG. 2 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a knowledgebase of uncertain information, an inconsistency detection module, a weighted justification generation module, a trust computation model module, a refined knowledgebase and a decision making module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing a data model that combines both a decidable subset of first order logic to capture the complexity of the information and a probabilistic mode to represent uncertainty.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for assessing trust in information, wherein the method comprises:
    collecting information from one or more information sources;
    detecting one or more inconsistencies in one or more statements from the information collected from the one or more sources;
    assigning a penalty to each information source involved in an inconsistency and a reward for each statement not involved in any inconsistencies; and
    using each assigned penalty and reward to perform an aggregation to assess trust in the collected information.

2. The method of claim 1, wherein the one or more information sources are heterogeneous with respect to trustworthiness.

3. The method of claim 1, wherein the information is represented as at least one of a simple first order logic statement, and a statement from a probabilistic extension of first order logic in order to capture uncertain information.

4. The method of claim 1, wherein an inconsistency is represented as a justification, wherein a justification comprises a minimal set of one or more axioms responsible for an inconsistency.

5. The method of claim 4, wherein a justification is weighted based on its likelihood of being selected if a selection process was random.

6. The method of claim 1, wherein using each assigned penalty and reward to perform an aggregation to assess trust in the collected information comprises providing each penalty and reward to a trust model for performance of an aggregation.

7. The method of claim 1, wherein a trust assessment of an information source is based on whether one or more statements of the source are among the one or more detected inconsistencies.

8. The method of claim 1, further comprising storing information in a knowledge base that captures complexity of the information through an encoding to a decidable subset of first order logic, and uncertainty of the information.

9. The method of claim 8, using trust assessment to refine the knowledge base.

10. The method of claim 1, further comprising using trust assessment to enhance information quality via determining a strength of credibility for each information source.

11. The method of claim 1, further comprising using trust assessment to classify one or more information sources wherein an inconsistency involves two or more information sources.

12. The method of claim 1, further comprising using trust assessment to classify one or more information sources wherein a penalty is asymmetrically assigned to an information source based on prior trust of the information source.

13. The method of claim 12, wherein a less trustworthy source is assigned a higher penalty.

14. The method of claim 1, wherein detecting one or more inconsistencies in one or more statements from the information collected from the one or more sources comprises the steps of:
representing a problem of justification computation as a traversal of a search tree; and
uniformly and randomly selecting one or more justifications from the search tree without performing a full traversal.

15. The method of claim 14, wherein uniformly and randomly selecting one or more justifications from the search tree without performing a full traversal does not produce a uniform and random sample of justifications, and a tradeoff between computation cost and bias is controlled by a tunable parameter.

16. The method of claim 1, further comprising providing a system, wherein the system comprises one or more distinct software modules, each of the one or more distinct software modules being embodied on a tangible computer-readable recordable storage medium, and wherein the one or more distinct software modules comprise a knowledgebase module, an inconsistency detection module, a weighted justification generation module and a trust computation model module executing on a hardware processor.

17. A computer program product comprising a tangible computer readable recordable storage device including computer useable program code for assessing trust in information, the computer program product including:
computer useable program code for collecting information from one or more information sources;
computer useable program code for detecting one or more inconsistencies in one or more statements from the information collected from the one or more sources;
computer useable program code for assigning a penalty to each information source involved in an inconsistency and a reward for each statement not involved in any inconsistencies; and
computer useable program code for using each assigned penalty and reward to perform an aggregation to assess trust in the collected information.

18. The computer program product of claim 17, wherein an inconsistency is represented as a justification, wherein a justification comprises a minimal set of one or more axioms responsible for an inconsistency.

19. The computer program product of claim 17, further comprising computer useable program code for using trust assessment to classify one or more information sources wherein a penalty is asymmetrically assigned to an information source based on prior trust of the information source.

20. The computer program product of claim 17, wherein the computer useable program code for detecting one or more inconsistencies in one or more statements from the information collected from the one or more sources comprises:
computer useable program code for representing a problem of justification computation as a traversal of a search tree; and
computer useable program code for uniformly and randomly selecting one or more justifications from the search tree without performing a full traversal.

21. A system for assessing trust in information, comprising:
a memory; and
at least one processor coupled to the memory and operative to:
collect information from one or more information sources;
detect one or more inconsistencies in one or more statements from the information collected from the one or more sources;
assign a penalty to each information source involved in an inconsistency and a reward for each statement not involved in any inconsistencies; and
use each assigned penalty and reward to perform an aggregation to assess trust in the collected information.

22. The system of claim 21, wherein an inconsistency is represented as a justification, wherein a justification comprises a minimal set of one or more axioms responsible for an inconsistency.

23. The system of claim 21, wherein the at least one processor coupled to the memory is further operative to use trust assessment to classify one or more information sources wherein a penalty is asymmetrically assigned to an information source based on prior trust of the information source.

24. The system of claim 21, wherein the at least one processor coupled to the memory operative to detect one or more inconsistencies in one or more statements from the information collected from the one or more sources is further operative to:
represent a problem of justification computation as a traversal of a search tree; and
uniformly and randomly select one or more justifications from the search tree without performing a full traversal.

25. An apparatus for assessing trust in information, the apparatus comprising:
means for collecting information from one or more information sources;
means for detecting one or more inconsistencies in one or more statements from the information collected from the one or more sources;
means for assigning a penalty to each information source involved in an inconsistency and a reward for each statement not involved in any inconsistencies; and
means for using each assigned penalty and reward to perform an aggregation to assess trust in the collected information.

* * * * *